United States Patent [19]

Hegemann

[11] 4,163,459
[45] Aug. 7, 1979

[54] MOBILE PIVOT TOWER FOR IRRIGATION SYSTEM

[75] Inventor: Kenneth J. Hegemann, Ewa Beach, Hi.

[73] Assignee: Rainmatic International, Ltd., Honolulu, Hi.

[21] Appl. No.: 845,648

[22] Filed: Oct. 26, 1977

[51] Int. Cl.² .............................................. B05B 3/12
[52] U.S. Cl. .................................... 137/344; 239/177; 239/213
[58] Field of Search ................. 137/344; 239/177, 212, 239/213

[56] References Cited

U.S. PATENT DOCUMENTS

| | | | |
|---|---|---|---|
| 3,361,360 | 1/1968 | Purtell | 137/344 X |
| 3,726,366 | 4/1973 | Williams | 137/344 X |
| 3,817,455 | 6/1974 | Cornelius | 137/344 X |

*Primary Examiner*—Gerald A. Michalsky
*Attorney, Agent, or Firm*—Merriam, Marshall & Bicknell

[57] ABSTRACT

A center pivot irrigation system comprises a plurality of mobile towers spaced apart and aligned in a row with an irrigation pipe extending between and supported atop the towers. The row of aligned towers pivots about a mobile pivot tower located at a water supply. The mobile pivot tower comprises a vertically disposed frame mounted on a pair of wheels. The frame and one wheel are mounted to pivot about the other wheel, and anchoring structure restrains the other wheel from moving during pivoting of the frame and one wheel.

11 Claims, 4 Drawing Figures

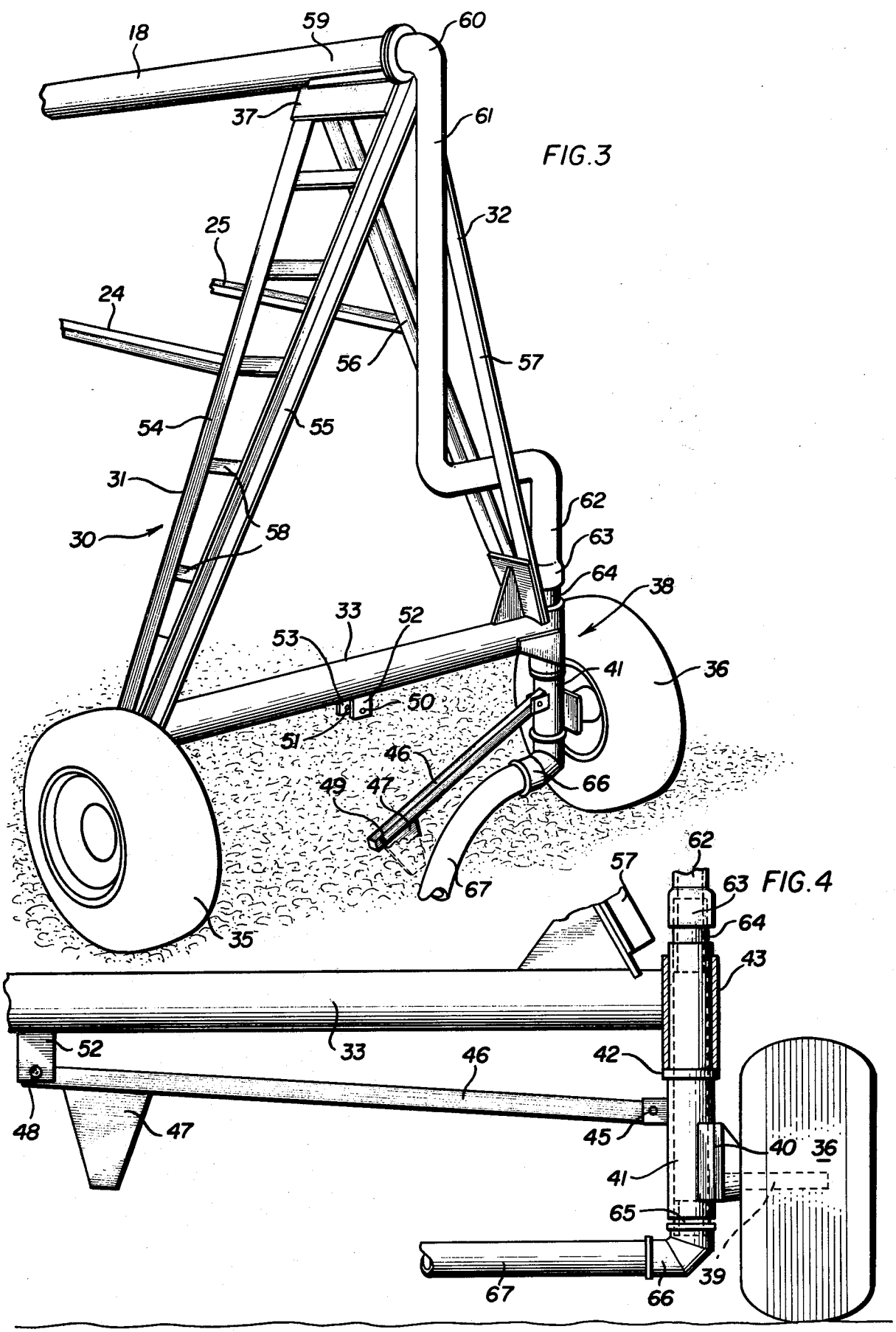

MOBILE PIVOT TOWER FOR IRRIGATION SYSTEM

BACKGROUND OF THE INVENTION

The present invention relates generally to mobile irrigation systems and more particularly to center pivot, mobile irrigation systems for watering farm land.

A conventional center pivot, mobile irrigation system includes a plurality of towers spaced-apart and aligned in a row. Each tower comprises a frame having upper and lower portions. At the top or upper portion of each frame is structure for supporting one end of an irrigation pipe section in a horizontal disposition and for coupling that pipe section to another pipe section. The sections of irrigation pipe extend from one tower top to the next, for a total distance up to as much as one half mile. The lower portion of each tower frame is connected to a pair of driven wheels. One end of the irrigation pipe is connected to a water source located adjacent a stationary or immobile pivot tower. Sprinklers are located at spaced intervals along the irrigation pipe.

In operation, the water is turned on, the sprinklers on the pipe begin to sprinkle, and the wheels in each of the mobile towers are driven in a manner which causes the mobile towers, together with the irrigation pipe carried by these towers, to pivot in a circular path about the stationary pivot tower while maintaining their alignment.

Each of the mobile towers in conventional systems is of essentially identical construction, while the stationary pivot tower has a different construction. In one embodiment, the stationary pivot tower is supported atop a concrete slab resting on concrete legs and is anchored in place on the concrete slab with chains, cables or the like, to prevent the pivot tower from moving while the rest of the irrigation system was pivoting about the location of the stationary pivot tower.

The drawbacks in an arrangement of the type discussed above were many. The stationary pivot tower was not susceptible to mass production techniques because only one such construction was required for each system or rig. In comparison, relatively large quantities of mobile towers were used in each system, thereby rendering the mobile towers susceptible to mass production techniques. Moreover, when it came time to move the irrigation system to another field or another portion of the same field, the pivot tower was not as readily transportable as the other towers in the irrigation system, if transportable at all.

SUMMARY OF THE INVENTION

In accordance with the present invention, there is provided a mobile pivot tower which eliminates the drawbacks of the conventional, stationary pivot towers utilized heretofore.

A mobile pivot tower in accordance with the present invention comprises a substantially vertically disposed frame having upper and lower portions. Structure is provided at the upper portion of the frame for supporting an irrigation pipe in a horizontal disposition extending away from the frame. The mobile pivot tower also comprises a pair of wheels, and structure is provided at the lower portion of the frame for mounting each of the wheels for rotation about a horizontal axis disposed transverse to the direction in which the irrigation pipe extends. The mobile pivot tower also includes structure mounting the frame and one of the wheels for pivotal movement in a horizontal direction about the other of the wheels. The mobile pivot tower further comprises anchoring structure for restraining the non-pivoting wheel against movement when the frame and the one wheel are pivoting.

In operation, the frame and the one wheel pivot with the rest of the irrigation system about the other wheel or the mobile pivot tower, the latter wheel remaining stationary.

Two conduit portions are located on the mobile pivot tower. One conduit portion is connected to the irrigation pipe. The other conduit portion is connected to a water source. The two conduit portions are coupled together and mounted on the tower so that the one conduit portion may pivot with the frame and the one wheel while the other conduit portion is restrained against pivoting.

By utilizing an arrangement of the type described above, the mobile pivot tower can be constructed with a frame essentially identical to the frames on the other mobile towers of the irrigation system except for that part of the lower portion of the frame adjacent the non-pivoting wheel. The concrete slab, concrete legs, chains and cables required with the conventional, stationary pivot towers are eliminated. In addition, the mobile pivot tower is readily transportable from one irrigation site to another.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 3 is a perspective of a mobile pivot tower in accordance with the present invention; and FIG. 4 is a fragmentary elevational view, partially in section, of the mobile pivot tower of FIG. 3.

DETAILED DESCRIPTION

Figure 1:
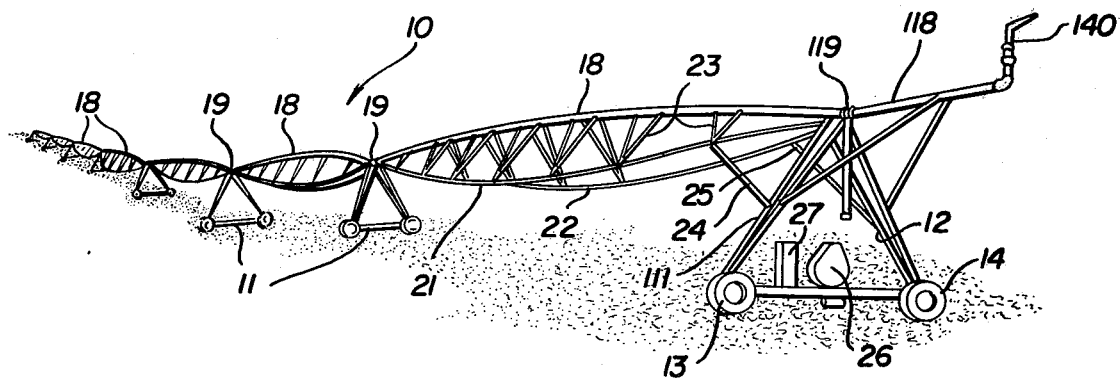
FIG. 1 is a perspective of a center pivot irrigation system.
Figure 2:
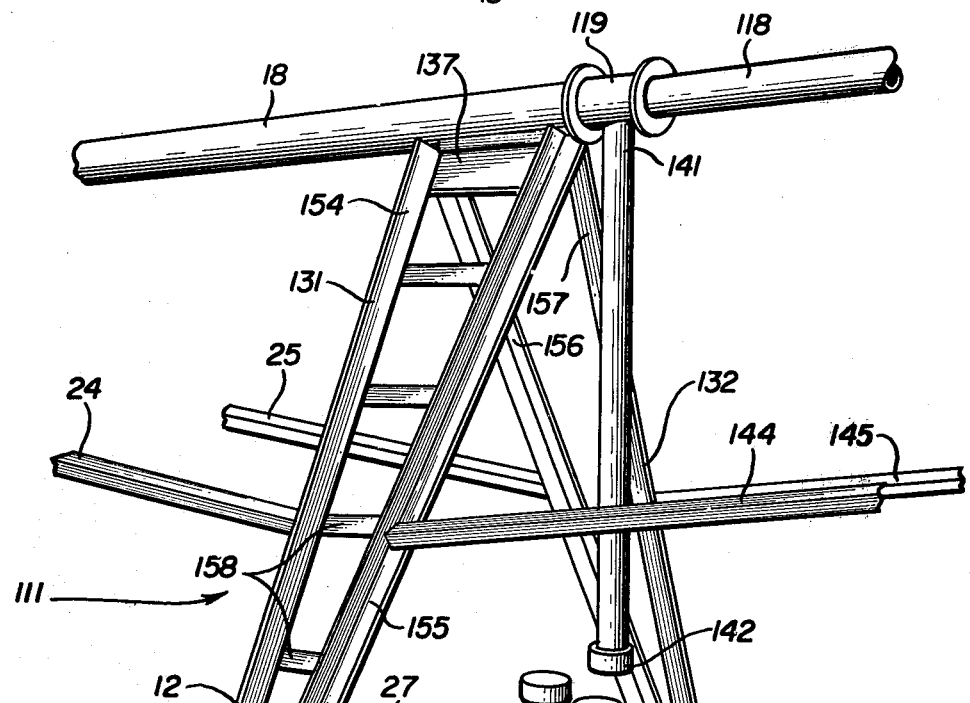
FIG. 2 is a perspective of a mobile tower in a center pivot irrigation system.
Figure 2:
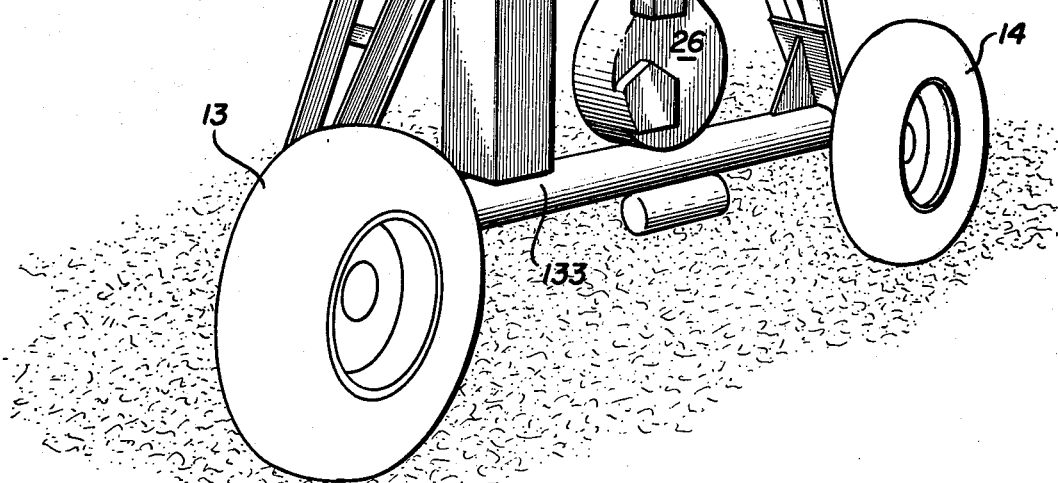

Referring initially to FIGS. 1 and 2, indicated generally at 10 in FIG. 1 is a center pivot irrigation system comprising a plurality of towers 11, aligned in a row and spaced apart. For convenience, the outermost tower in the row (i.e., the tower farthest from the water source) is designated 111 in FIGS. 1 and 2. However, towers 11 and 111 are identical in construction.

Each tower 11 or 111 comprises a triangular-shaped vertically disposed frame 12 and a pair of driven wheels 13, 14 for imparting mobility to the tower. Extending between the tops of each tower 11, or 111 is an irrigation pipe section 18 coupled to an adjacent irrigation pipe section 18 at 19 on each tower 11.

Assisting in the support of a pipe section 18 between towers 11, or 111 are longitudinal members 21, 22 both located below the pipe section 18 they support. Extending between longitudinal members 21, 22 and pipe section 18 are a plurality of struts or braces 23. Extending between each frame 12 and longitudinal pipe-supporting members 21, 22 are diagonal members 24, 25 respectively. In FIG. 1, diagonal members 24, 25 are shown only in connection with outermost tower 111, but the other towers 11 shown in FIG. 1 are also provided with such diagonal members 24, 25 although these are not shown in the drawing.

Referring to FIG. 2, each of the wheels 13, 14 on a tower 11 or 111 is powered by a hydraulic motor (not shown) located at the wheel and associated with a hydraulic pump 26 and a hydraulic fluid reservoir 27. The driving mechanism for towers 11 may be of conventional construction and does not constitute a part of this invention. Suffice it to say that, in operation of the center pivot irrigation system 10, each of the towers 11 or 111 is driven along a circular path, about a mobile pivot tower 30 illustrated in FIG. 3, while maintaining the alignment of the towers.

In accordance with the present invention, mobile pivot tower 30 (FIG. 3) comprises a substantially vertically disposed frame arranged in the form of a triangle having a pair of vertically inclined legs 31, 32 connected at their lower ends by a horizontal cross-member 33 having a tubular cross-section. Legs 31, 32 each comprises a pair of vertically extending members 54, 55 and 56, 57 respectively, and leg 31 additionally comprises a plurality of horizontal cross braces 58 which define a ladder providing ready access to the top of frame 12.

Frame legs 31, 32 converge together at their upper ends to form a frame upper portion 37 on which is supported one end of an irrigation pipe section 18 disposed horizontally and extending away from the frame defined by members 31, 32, 33.

A pair of wheels 35, 36 are located adjacent the lower portion of the frame 31, 32, 33, and each wheel has a horizontal axis of rotation disposed transverse to the direction in which extends pipe section 18.

Located adjacent wheel 36 is structure, indicated generally at 38 in FIGS. 3 and 4, mounting frame 31, 32, 33 and wheel 35 for pivotal movement in a horizontal direction about wheel 36. Pivotal mounting structure 38 is described more fully beginning in the following paragraph.

Connected at 40 to the axle 39 of wheel 36 is the lower portion of a first vertically disposed tubular member 41 having an annular shoulder portion 42. Supported on shoulder portion 42 is the lower end of a second vertical tubular member 43 movably mounted around first tubular member 41 and fixed to one end of lower horizontal cross-member 33 of the tower frame.

By virtue of the structure described in the preceding paragraph, wheel 35, together with frame 31, 32, 33 and second tubular member 43, may pivot about the axis of first tubular member 41, while tubular member 41 and associated structure comprising connecting element 40, axle 39 and wheel 36 remain stationary. To assist in restraining wheel 36 and tubular member 41 from moving, there is provided anchoring structure described in the following paragraph.

Pivotally connected to first tubular member 41, at pivotal connection 45, is one end of a bar 46 near the other end of which is located a downwardly, depending spade element 47. Bar 46 and spade element 47 are mounted for movement between a raised, inoperative position (shown in FIG. 4) and a lowered, operative, anchoring position shown in FIG. 3. Bar 46 and spade element 47 may be retained in their upper, inoperative positions with structure described in the following paragraph.

Depending from lower frame member 33 are a pair of aligned, spaced tabs 52, 53 having respective openings 50, 51 (FIG. 3). Located in the end of bar 46 adjacent spade element 47 is an opening 49. When bar 46 is in its raised, inoperative position, opening 49 on bar 46, is aligned with openings 50, 51 in depending tabs 52, 53 and bar 46 may be maintained in the raised position by inserting a pin 48 (FIG. 4) through aligned openings 49, 50, 51.

As an additional restraint against movement, blocks (not shown) can be wedged against each side of wheel 36 at its periphery.

As noted above, upper frame portion 37 on mobile pivot tower 30 supports one end 59 of an irrigation pipe section 18. Connected to pipe end 59 is the upper end 60 of a conduit 61 extending downwardly from the top of pivot tower 30 and terminating at a lower end 62 connected by a pivotable coupling portion 63 to a short length of pipe 64 fixed to and communicating with the top portion of tubular member 41. Extending from the bottom of tubular member 41, and fixed thereto, is another short length of pipe 65 connected by an elbow coupling 66 to a pipe 67 communicating with a water source, such as a well or reservoir. Appropriate seals (not shown) are provided at couplings 63, 64 to prevent water leakage.

Upper conduit 61 and coupling portion 63 pivot with frame 31, 32, 33 and wheel 35. Pipes 64, 65 and tubular member 41 remain stationary with wheel 36 while the frame and wheel 35 pivot. When the anchor defined by elements 46, 47 is in the lowered position illustrated in FIG. 3, it acts to restrain the lower conduit, defined by tubular member 41 and pipes 64, 65 against movement during pivotal movement of the frame and wheel 35.

Referring again to FIGS. 1 and 2, aside from mobile pivot tower 30 (shown in FIGS. 3 and 4) all the other towers 11 or 111 in the center pivot irrigation system are identical and differ from mobile pivot tower 30 only with respect to the pivotal mounting structure 38, adjacent wheel 36 of tower 30, which permits the frame and wheel 35 to pivot about wheel 36. No such structure is provided on towers 11, 111.

More specifically, like mobile pivot tower 30, each tower 11 or 111 has a frame 12 comprising a pair of vertically inclined legs 131, 132 and a lower horizontal cross-member 133 all of which together define an essentially triangular shaped frame 12. Located at the top of frame 12 is an upper portion 137 for supporting one end of an irrigation pipe section 18. Legs 131, 132 each comprise a pair of vertically extending members 154, 155 and 156, 157, respectively, and legs 131 additionally comprises a plurality of cross braces 158.

In the tower 111 illustrated in FIG. 2, which is the outermost tower in the irrigation system, pipe section 18 is coupled at 119 to an extension pipe 118 terminating at a sprinkler 140 (FIG. 1). Extending downwardly from coupling 119 is a pipe 141 for collecting particulate matter washed along the pipeline defined by sections 18. Located at the bottom of downwardly depending pipe 141 is a cap 142 which may be periodically removed to flush from pipe 141 the particulate matter collected therein.

Extending diagonally upwardly from legs 131, 132 of outermost tower 111 shown in FIG. 2 are a pair of diagonal braces 144, 145 having upper ends terminating at extension pipe 118.

The entire irrigation system comprising outlying towers 11 and 111 and mobile pivot tower 30 may be moved from one irrigation site to another. Pivot tower 30 is rendered mobile merely by raising anchor 46, 47 to its inoperative position which allows tower 30 to be towed. Towers 11 and 111 are rendered movable to another site by swiveling wheels 13, 14 from the disposition shown in FIGS. 1 and 2 (wherein the axes of the wheels are parallel to pipe sections 18 and transverse to frame lower member 133) to a disposition like that shown in FIGS. 3 and 4 for wheels 35, 36 on pivot tower 30 (wherein the wheel axes are parallel to frame lower member 133). The wheel swiveling structure (not shown) may be of conventional construction and constitutes no part of this invention.

The foregoing detailed description has been given for clearness of understanding only, and no unnecessary limitations should be understood therefrom as modifications will be obvious to those skilled in the art.

What is claimed is:

1. A mobile pivot tower for an irrigation system, said mobile pivot tower comprising:
    substantially vertically disposed frame means having upper and lower portions;
    means at the upper portion of said frame means for supporting an irrigation pipe in a horizontal disposition extending away from said frame means;
    a pair of wheels located adjacent the lower portion of said frame means;
    each of said wheels having a horizontal axis of rotation disposed transverse to the direction in which said irrigation pipe extends;
    and means mounting said frame means and one of said wheels for free pivotal movement about a vertical axis during an irrigating operation of said system, said mounting means being located adjacent the other of said wheels while said other wheel remains stationary.

2. A mobile pivot tower as recited in claim 1 wherein said pivotal mounting means comprises:
    a first member, having a vertically disposed axis;
    means connecting said first member to said other wheel;
    a second member having a vertically disposed axis, attached to said frame means and pivotable therewith;
    and means mounting said second member on said first member for rotation of the second member about the axis of said first member.

3. A mobile pivot tower as recited in claim 2 and comprising:
    anchor means for restraining said other wheel against movement when the frame means and the one wheel are pivoting;
    and means connecting said anchor means to said first member.

4. A pivot tower as recited in claim 3 wherein:
    said last recited connecting means comprises means mounting said anchor means for movement between a raised, inoperative position and a lowered, operative, anchoring position.

5. A mobile pivot tower as recited in claim 1 and comprising:
    anchor means for restraining said other wheel against movement when the frame means and the one wheel are pivoting.

6. A mobile pivot tower as recited in claim 5 and comprising:
    means mounting said anchor means for movement between a raised, inoperative position and a lowered, operative, anchoring position.

7. A mobile pivot tower as recited in claim 1 and comprising:
    conduit means having a pair of opposite ends;
    means for connecting one end of said conduit means to a water source;
    and means for restraining said conduit means against pivotal movement during said pivotal movement of the frame means and said one wheel.

8. A mobile pivot tower as recited in claim 7 and comprising:
    second conduit means having a pair of opposite ends;
    means for connecting one end of said second conduit means to said irrigation pipe;
    and means for coupling the other end of said first recited conduit means to the other end of said second conduit means while permitting said second conduit means to pivot with said frame means and said one wheel.

9. A mobile pivot tower as recited in claim 1 wherein said pivotal mounting means comprises:
    a first vertically disposed tubular member located alongside said other wheel;
    means connecting said first tubular member to said other wheel;
    a second vertically disposed tubular member attached to said frame means;
    means mounting said second tubular member on the outside of said first tubular member for rotation of the second tubular member about the vertical axis of said first tubular member;
    first conduit means having a pair of opposite ends;
    means for connecting one end of said first conduit means to a water source;
    second conduit means having a pair of opposite ends;
    means for connecting one end of said second conduit means to said irrigation pipe;
    means for coupling the other end of said first conduit means to the other end of said second conduit means;
    said first conduit means including said first tubular member as a portion thereof.

10. A mobile pivot tower as recited in claim 9 and comprising:
    anchor means attached to said first tubular member for restraining the latter against movement when the frame means and the one wheel are pivoting.

11. In combination with the mobile pivot tower of claim 1:
    a plurality of other mobile towers radially spaced from and coupled to said pivot tower;
    each of said other towers comprising substantially vertically disposed frame means having upper and lower portions and a pair of wheels;
    said upper and lower portions of the frame means on said mobile pivot tower being essentially identical to the upper and lower portions of the frame means on said other towers except for said pivotal mounting means on the mobile pivot tower.

* * * * *